2,871,209
AMINOPLAST RESIN COATING COMPOSITIONS

James P. Shelley, Drexel Hill, Pa., assignor to Rohm & Haas Company, Philadelphia, Pa., a corporation of Delaware No Drawing. Application October 24, 1956
Serial No. 617,934

16 Claims. (Cl. 260—21)

This invention relates to the catalysis of alkylated polymethylol aminoplast resin-forming condensates which are adapted to produce coatings alone or in combination with alkyd resins or other materials.

An object of the present invention is to provide catalyzed aminoplast condensates of the type just mentioned which have good compatibility with alkyds in general, including long oil alkyds, that is those having 60% or more oil combined in the alkyd. A particular object of the present invention is to provide an efficient catalyst for the aminoplast that is adapted to provide rapid curing of the aminoplast even when it is combined with long oil alkyds. Another object is to provide an efficient catalyst for such aminoplast alkyd compositions which provides improved properties in the coatings obtained therefrom. Other objects and advantages will be apparent and expressly pointed out in the following description.

The alkylated polymethylol aminoplast condensates with which the present invention is concerned are those derived from urea and aminotriazines, such as melamine and acetoguanamine, by the reaction therewith of formaldehyde and the alkylation of the polymethylol derivative thereby obtained with an alcohol having 3 to 6 carbon atoms, such as n-butyl alcohol, isobutyl alcohol, and sec-butyl alcohol, as well as 2-ethylbutanol, n-hexanol and cyclohexyl alcohol. The preferred compositions are those obtained with n-butyl alcohol. These aminoplasts may be produced in any conventional fashion, such as by the usual procedure of first reacting the nitrogen-containing compound with formaldehyde in aqueous or aqueous alcoholic solution under alkaline conditions and then reacting the polymethylol derivative obtained thereby with the alcohol under acid conditions.

These aminoplasts, which are alkylated with alcohols having 3 to 6 carbons, have good compatibility with alkyds in general and even with the long oil alkyds which contain 60% or more oil reacted therein. However, the catalysts conventionally used, such as the half-ester of dicarboxylic acids, such as oxalic or maleic acid, with an alcohol, such as butanol or phosphoric acid, are incapable of being cured to a hard condition under normal temperature and time conditions commercially employed. While this defective curing capacity is frequently characterized by stating that the resins are slow-curing, it is perhaps more appropriate to state that the curing efficiency of the catalysts employed is low. The usual catalysts referred to give reasonably good gloss and relatively low hardness, such as a Tukon hardness of 2 or less when baked at 250° F. for 30 minutes. This is suitable for applications where a high temperature bake or cure is used, such as in coatings for stoves, Venetian blinds, or portable heaters. However, such catalyzed compositions are unsuitable for applications requiring a low temperature bake or cure, such as in the force-dried furniture finishes and in certain automotive or metal decorating enamel systems.

The substitution of such catalysts as p-toluenesulfonic acid, sulfuric acid, hydrochloric acid, oxalic acid, halogenoacetic acids, and others has been found to provide a more efficient cure and greater hardness but the gloss obtained in the coating and the adhesion thereof to metals and other surfaces are both materially reduced. The present invention is based on the surprising discovery that maleic acid, when used in the form of its monosalt with triethylamine, not only produces a high efficiency of cure in such aminoplast compositions but also improves the gloss and the adhesion of the alkyd aminoplast coatings to various substrates and especially to metals. The triethylamine salt is surprisingly unique in this respect since the analogous diethylamine salt reduces the gloss instead of improving it and the monosalts of fumaric and succinic acid with triethylamine are low efficiency catalysts giving no greater rate of cure or hardness than is obtainable with the usual catalysts mentioned hereinabove, such as the half-ester of butanol with oxalic or maleic acids.

The monosalt of maleic acid with triethylamine is readily made by slurrying maleic acid in a lower alcohol, such as isopropyl alcohol, n-butanol, or the like, and then adding triethylamine substantially in the amount of one mole for each mole of maleic acid. The total concentration of acid and amine may be from 5 to about 40% by weight. Preferably, it is 30 to 40% to provide as high a concentration of the salt as possible. At about 40%, the solution in isopropyl alcohol is substantially saturated with the salt product. The mixing of the amine with the maleic acid is effected at low temperatures between 10° and 35° C. and preferably between 15° and 20° C. to minimize discoloration and esterification. The amine is preferably added to the slurry gradually and, as the salt forms, it goes into the solution. Suitable means may be provided to control the temperature, or temperature control may depend entirely upon controlling the rate of addition of the amine to the acid slurry. The time required may be simply that required for the addition which would depend upon the size of the batch. Times of one hour or more are often suitable. There is no need to remove the isopropyl alcohol or other alcohol used since it may form a part of the solvent used in preparing the coating composition containing the aminoplast condensate. The salt has a pH of 3.5 to 4.5 in aqueous solution.

The amount of the monoamine-maleic acid salt added to the aminoplast coating composition may be from about 1% to about 8% on the weight of the alkylated polymethylol aminoplast. When the aminoplast is derived from urea or melamine itself, the amount of catalyst is preferably in the range of about 1% to 3%. At normal room temperature the aminoplast condensate containing the triethylamine-maleic acid monosalt is stable so that it may be stored for considerable periods of time without suffering gelation, resulting from premature curing. Similarly, compositions containing the alkyd, the catalyst of the present invention, and the aminoplast condensate can be stored for long periods of time without suffering serious increase in viscosity or gelation.

In the usual preparation of the thermosetting alkylated polymethylol aminoplast, a certain amount of an organic solvent, such as an alcohol, is present. This solvent may serve as a common solvent for the aminoplast, the triethylamine salt of maleic acid and also of the alkyd when the latter is used. Besides using any of the alcohols mentioned hereinabove, other solvents may be used instead or in addition thereto. Such additional solvents include esters such as ethyl acetate, ethoxyethyl acetate, butoxyethyl acetate, acetone, butanone, methyl ethyl ketone, dioxane, dimethylformamide, dimethylacetamide, nitroparaffins, such as nitroethane and nitropropane, acetonitrile, aromatic hydrocarbons, such as xylene, toluene, benzene, chlorinated hydrocarbons, such as chloroform, carbon tetrachloride, ethylene dichloride, and the like.

Depending upon the particular method of application, the concentration of the composition may vary widely.

For example, the solution of the aminoplast (which may or may not contain an alkyd) may contain from 1 to about 50% by weight of aminoplast (or of aminoplast and alkyd) for coating purposes. The aminoplast compositions with or without an alkyd therein may be applied by spraying, dipping, brushing, roll-transfer, or in any other suitable manner.

After application of the composition to a surface, it may be allowed to dry by exposure to normal atmospheric air currents. Alternatively, it may be dried by application of heated air, by application of infrared rays, radio frequency currents, or in any other suitable manner. After drying or during drying, curing is effected by heating to a temperature of about 200° F. to 400° F. or higher for a period of time that generally is inversely proportional to the temperature and may be from about 30 seconds to an hour or so. The combined factors of temperature and time depend upon the particular solvent used and the thickness of coating.

The compositions may be pigmented if clear coatings are not desired. For this purpose, there may be incorporated into the composition an amount of pigment, extender, filler, delustrant, or the like, such that the weight ratio of binder solids (including the aminoplast and alkyd) to pigment is from 12:1 to 1:20, depending upon the particular effect desired. For most purposes, the ratio of binder to pigment may be from 1:1 to 6:1. Any pigments may be employed including titanium dioxide, copper phthalocyanine, ultramarine blue, zirconium oxide, lead chromate, barium sulfate, zinc chromate, carbon black, and so on.

The alkyds that may be used in conjunction with the catalyzed aminoplast of the present invention include simple condensates of dicarboxylic acids with glycols as well as more complex polyesters obtained by the condensation of dicarboxylic acids with polyols which may or may not be modified with a fatty acid or fatty acids. The dicarboxylic acids that may be used include phthalic, succinic, adipic, or sebacic acids. The glycols that may be used include ethylene glycol, diethylene glycol, propylene glycol, dipropylene glycol, and trimethylene glycol. The oil modified alkyds that may be used include those obtained by condensing one of the above-mentioned dicarboxylic acids with a polyhydric alcohol comprising at least 25% by weight of at least one alcohol containing at least three hydroxyl groups, such as glycerol, trimethylolethane, trimethylolpropane, pentaerythritol, sorbitol, mannitol, dulcitol, or inositol, modified with a fatty acid or fatty acid mixture derived from drying, semi-drying, or non-drying oils or fats, the fatty acid having from 12 to 30 carbon atoms and up. The dicarboxylic acids mentioned may also be mixed with a small proportion of maleic acid, such as up to 10% or 15% on the weight of the total dicarboxylic acid. Up to 75% by weight of the polyhydric alcohol may consist of a dihydric alcohol, such as ethylene glycol, diethylene glycol, propylene glycol, dipropylene glycol, and trimethylene glycol. The modifying fatty acid may be lauric acid, myristic acid, coconut oil fatty acids, palm oil fatty acids, palmitic, oleic, stearic, linolenic, fatty acids obtained by hydrogenation of fish, animal, or vegetable oils or fats. In preparing the oil-modified alkyd, the glycerol or other polyhydric alcohol or mixture thereof may first be partially esterified with the monoacid or mixture thereof, and the resulting partial ester may then be reacted with the dicarboxylic acid, such as phthalic acid. Alternatively, the dicarboxylic acid, the polyhydric alcohol and the monocarboxylic acids may be mixed together and reacted simultaneously. It is preferred to use alkyds modified with essentially saturated, non-drying fatty acids to assure freedom from yellowing and embrittlement on ageing. Preferred alkyds may be obtained from 39% to 50% phthalic acid, 20% to 30% glycerol, and 30% to 35% coconut fatty acids. The preparation of the alkyd is in itself no part of the present invention, since conventional oil-modified alkyds may be used.

When the aminoplast is mixed with an alkyd to form coating compositions, the proportion of the two components may vary and different proportions may be used in dependence upon the particular aminoplast and the particular alkyd that are combined. Generally, when an alkylated polymethylol urea is mixed with one of the alkyds, the range of urea aminoplast may be from about 25 to 40% of the total weight of aminoplast and alkyd, whereas when a melamine aminoplast is mixed with the alkyd, it is generally preferred to use from 25 to 30% of the aminoplast on the total weight of aminoplast plus alkyd.

The coatings may be applied to all sorts of surfaces for a wide variety of purposes. They are particularly desirable for application to the surface of metals, such as iron, steel, copper, brass, aluminum, chromium, nickel, and the like; to glass, porcelain and other vitreous materials; to articles made of plastic materials, such as of methyl methacrylate or copolymers thereof; wood, textile fabrics, leather, paper, cardboard, and so on.

In the following examples, which are illustrative of the invention, the parts and percentages are by weight unless otherwise indicated:

EXAMPLE 1

Thermosetting coating compositions comprising 50 parts of titanium dioxide, 58.3 parts of a solution in xylol of 35 parts of an oil-modified alkyd containing 47% phthalic anhydride, 20% glycerol, and 33% of coconut fatty acids, 30 parts of a solution in 15 parts of a 1:1 mixture of xylol and butyl alcohol of 15 parts of a butylated urea-formaldehyde condensate and, as a catalyst (except for controls to which no acid catalyst is added), 0.15 part of one of the acids listed in the first column of Table A or 0.3 part of one of the amine salts listed to provide 0.15 part of maleic acid are coated on steel panels, dried and then baked at 250° F. for 30 minutes. Hardness, gloss, and adhesion of the coatings are then observed or tested. When a letter is used in the table to designate hardness, the reference is to the pencil hardness scale, whereas when designation is by a number exclusively, reference is to the Knoop hardness scale.

The Knoop hardness number is determined in accordance with the procedure described in "Indentation Hardness Testing," by V. E. Lysaght, Reinhold Publishing Company, p. 189. In the examples herein, a Tukon hardness tester of the Wilson Mechanical Instrument Company was used. Its pressure element was applied without impact under a 25-gram load to the coating and the indentation resulting was measured with the aid of a microscope. Gloss ratings given are either visual observations or, wherever numerical values are given, they represent readings on a 60° Photovolt glossimeter made by the Photovolt Corporation. Adhesion values are those determined by manually scraping the coating with a sharp knife.

*Table A*

| Catalyst | Hardness | Gloss | Adhesion |
| --- | --- | --- | --- |
| None | 5B to 3B<br>1.8 to 3.4 | 74.5 | Good. |
| Maleic acid monosalt of triethylamine | 12.4 | 76 | Do. |
| Maleic acid monosalt of diethylamine | 11.1 | 67 | Do. |
| Fluorochloro-octanoic acid | 10.6 | Poor | Poor. |
| p-Toluenesulfonic acid | 5.2 | Very flat | Very poor. |
| Oxalic acid | B | 65 | Poor. |
| Trichloroacetic acid | F | Flat | Do. |
| Dichloroacetic acid | F | do | Do. |
| Monochloroacetic acid | B | do | Do. |
| Isooctyl acid Phosphate | B+ | do | Do. |
| Dimethyl acid pyrophosphate | B+ | do | Do. |
| Phosphoric acid (ortho) | 2.85 | 78.3 | OK. |
| Hydrochloric acid | Very hard | Flat | Very poor. |
| Sulfuric acid | Very hard and discolored | Very Flat | Do. |

EXAMPLE 2

Thermosetting coating compositions comprising 50 parts of titanium dioxide, 58.3 parts of a solution in 13.3 parts xylol of 35 parts of an oil-modified alkyd containing 47% phthalic anhydride, 20% glycerol and 33% of coconut fatty acids, 25 parts of a solution in 10 parts of a 1:1 mixture of xylol and butyl alcohol of 15 parts of a butylated melamine-formaldehyde condensate, and 0.3 part of the triethylamine monosalt of maleic acid are coated on steel panels, dried and then baked at 300° F. for 30 minutes. Hardness, gloss, and adhesion of the coatings are then tested and compared with coatings obtained in the same way from the same composition but without the amine-salt catalyst (see Table B).

Table B

| Catalyst | Hardness | Photovolt Gloss | Microknife[1] Adhesion |
|---|---|---|---|
| No | 8.4 | 82 | 7.1 |
| Yes | 12.1 | 89 | 6.3 |

[1] The values of adhesion are those obtained on a standard Arco microknife made by Gardner Laboratories, Inc. Lower numerical values indicate greater adhesion.

EXAMPLE 3

Thermosetting coating compositions comprising 50 parts of titanium dioxide, 58.3 parts of a solution in 13.3 parts xylol of 35 parts of an oil-modified alkyd containing 47% phthalic anhydride, 20% glycerol and 33% of coconut fatty acids, 25 parts of a solution in 10 parts of a 1:1 mixture of xylol and butyl alcohol of 15 parts of a butylated acetoguanamine-formaldehyde condensate, and 1.2 parts of the triethylamine monosalt of maleic acid are coated on steel panels, dried and then baked at 300° F. for 30 minutes. Hardness, gloss, and adhesion of the coating are then tested and compared with coatings obtained in the same way from the same composition but without the amine-salt catalyst. All of the coatings have good adhesion and very high gloss. Those obtained with the amine salt have a hardness of 16.2 as compared to 14.9 without the catalyst.

EXAMPLE 4

Thermosetting coating compositions comprising 50 parts of titanium dioxide, 58.3 parts of a solution in 13.3 parts xylol of 35 parts of an oil-modified alkyd containing 47% phthalic anhydride, 20% glycerol and 33% of coconut fatty acids, 25 parts of a solution in 10 parts of a 1 : 1 mixture of xylol and butyl alcohol of 15 parts of a butylated urea-formaldehyde condensate, and 0.3 part of the triethylamine monosalt of maleic acid are coated on steel panels, dried and then baked at 300° F. for 30 minutes. Hardness, gloss, and adhesion of the coatings are then tested and compared with coatings obtained in the same way from the same composition but without the amine-salt catalyst (see Table C).

Table C

| Catalyst | Hardness | Photovolt Gloss | Microknife Adhesion |
|---|---|---|---|
| No | 6.3 to 6.5 | 77 to 79 | 6.9 to 7.4 |
| Yes | 10.7 to 11.3 | 83 to 84 | 5.9 to 6.3 |

EXAMPLE 5

1.67 grams of a solution comprised of 0.50 gram of maleic acid, 0.44 gram of triethylamine and 0.73 gram of 99% isopropyl alcohol is added to 100.0 grams of a n-butyl alcohol-modified-urea-formaldehyde resin consisting of 50% resin solids in equal parts butanolxylol. A film of the above mixture is spread on glass and baked at 250° F. for 30 minutes. A similar film of the untreated resin (control) is baked under the same conditions at the same time. A comparison of the baked films shows that the resin containing the maleic acid-triethylamine salt is substantially harder than the film of the same resin not containing the maleic acid salt.

Similarly the adhesion of the treated film (as determined by knife) is noticeably superior to that of untreated film. No particular difference in gloss is discernible as both films have high gloss.

EXAMPLE 6

1.67 grams of a solution comprised of 0.50 gram of maleic acid, 0.44 gram of triethylamine and 0.73 gram of 99% isopropyl alcohol is added to 83.4 grams of a n-butyl alcohol-modified-melamine-formaldehyde resin consisting of 60% resin solids in equal parts butanol/xylol. A film of the above mixture is spread on glass and baked at 250° F. for 30 minutes. A similar film of the untreated resin (control) is baked under the same conditions at the same time. A comparison of the baked films shows that the resin containing the maleic acid-triethylamine salt is substantially harder than the film of the same resin not containing the maleic acid salt.

Similarly the adhesion of the treated film (as determined by knife) is noticeably superior to that of untreated film. No particular difference in gloss is discernible as both films have high gloss.

It is to be understood that changes and variations may be made without departing from the spirit and scope of the invention as defined in the appended claims.

I claim:

1. A composition comprising a solution, in an organic solvent comprising an alcohol having 3 to 6 carbon atoms, of a long-oil alkyd resin, a butylated dimethylolurea, and the monosalt of maleic acid with triethylamine, the concentration of alkyd and butylated dimethylolurea being from about 1 to 50% by weight, there being present 30 to 40 parts by weight of butylated dimethylolurea, 70 to 60 parts by weight respectively of the alkyd and about 1 to 3 parts by weight of the monosalt.

2. A composition comprising a solution, in an organic solvent comprising an alcohol having 3 to 6 carbon atoms, of a long-oil alkyd resin, a butylated polymethylolmelamine, and the monosalt of maleic acid with triethylamine, the concentration of alkyd and butylated polymethylolmelamine being from about 1 to 50% by weight, there being present 25 to 30 parts by weight of butylated polymethylolmelamine, 75 to 70 parts by weight respectively of the alkyd and about 1 to 3 parts by weight of the monosalt.

3. A composition comprising a solution, in an organic solvent comprising an alcohol having 3 to 6 carbon atoms, of a long-oil alkyd resin, a butylated polymethylolacetoguanamine, and the monosalt of maleic acid with triethylamine, the concentration of alkyd and butylated polymethylolacetoguanamine being from about 1 to 50% by weight, there being present 25 to 30 parts by weight of butylated polymethylolacetoguanamine, 75 to 70 parts by weight respectively of the alkyd and about 1 to 8 parts by weight of the monosalt.

4. A composition comprising a resin-forming condensate of formaldehyde with a member selected from the group consisting of urea and aminotriazines alkylated by an alcohol having 3 to 6 carbon atoms and, as a catalyst therefor, a small amount of the monosalt of maleic acid with triethylamine.

5. A composition as defined in claim 4 in which about 1 to 8% of monosalt is present based on the weight of the condensate.

6. A composition comprising a resin-forming butlyated condensate of formaldehyde with a member selected from the group consisting of urea and aminotriazines and, as a catalyst therefor, a small amount of the monosalt of maleic acid with triethylamine.

7. A composition comprising a resin-forming butlyated condensate of formaldehyde with urea and, as a catalyst therefor, a small amount of the monosalt of maleic acid with triethylamine.

8. A composition comprising a resin-forming butylated condensate of formaldehyde with melamine and, as a catalyst therefor, a small amount of the monosalt of maleic acid with triethylamine.

9. A composition comprising a resin-forming butylated condensate of formaldehyde with acetoguanamine and, as a catalyst therefor, a small amount of the monosalt of maleic acid with triethylamine.

10. A composition comprising an alkyd resin, a resin-forming condensate of formaldehyde with a member selected from the group consisting of urea and aminotriazines alkylated by an alcohol having 3 to 6 carbon atoms and, as a catalyst therefor, a small amount of the monosalt of maleic acid with triethylamine, the proportions of condensate and alkyd resin being between 25 to 40 parts by weight of the former and 75 to 60 parts by weight of the latter.

11. A composition as defined in claim 10 in which about 1 to 8% of monosalt is present based on the weight of the condensate.

12. A composition as defined in claim 10 in which the alkyd resin is an oil-modified alkyd resin.

13. A composition as defined in claim 10 in which the alkyd resin is a long oil-modified alkyd resin.

14. A composition comprising an organic solvent solution of a resin-forming condensate of formaldehyde with a member selected from the group consisting of urea and aminotriazines alkylated by an alcohol having 3 to 6 carbon atoms and, as a catalyst therefor, a small amount of the monosalt of maleic acid with triethylamine.

15. A composition comprising an organic solvent solution of an alkyd resin, a resin-forming condensate of formaldehyde with a member selected from the group consisting of urea and aminotriazines alkylated by an alcohol having 3 to 6 carbon atoms and, as a catalyst therefor, a small amount of the monosalt of maleic acid with triethylamine, the proportions of condensate and alkyd resin being between 25 to 40 parts by weight of the former and 75 to 60 parts by weight of the latter.

16. A composition as defined in claim 15 in which the condensate is alkylated by an alcohol having 4 carbon atoms.

References Cited in the file of this patent

UNITED STATES PATENTS

| | | |
|---|---|---|
| 2,088,227 | Battye et al. | July 27, 1937 |
| 2,466,744 | Scott | Apr. 12, 1949 |
| 2,576,711 | Barsky et al. | Nov. 27, 1951 |
| 2,684,346 | Nickerson | July 20, 1954 |